April 8, 1924.

P. J. LUCEY

INDEXING DEVICE FOR SLICING MACHINES

Filed June 5, 1922

Inventor:
Patrick J. Lucey

April 8, 1924.

P. J. LUCEY 1,489,580

INDEXING DEVICE FOR SLICING MACHINES

Filed June 5, 1922     6 Sheets-Sheet 2

Inventor:
Patrick J. Lucey

April 8, 1924.

P. J. LUCEY 1,489,580

INDEXING DEVICE FOR SLICING MACHINES

Filed June 5, 1922     6 Sheets-Sheet 3

Inventor:
Patrick J. Lucey

April 8, 1924.

P. J. LUCEY 1,489,580

INDEXING DEVICE FOR SLICING MACHINES

Filed June 5, 1922    6 Sheets-Sheet 4

Inventor
Patrick J. Lucey

April 8, 1924.                               1,489,580
P. J. LUCEY
INDEXING DEVICE FOR SLICING MACHINES
Filed June 5, 1922          6 Sheets-Sheet 5

Inventor:
Patrick J. Lucey

Patented Apr. 8, 1924.

1,489,580

UNITED STATES PATENT OFFICE.

PATRICK J. LUCEY, OF CHICAGO, ILLINOIS, ASSIGNOR TO LUCEY SLICING MACHINE COMPANY, OF CHICAGO, ILLINOIS, A CORPORATION OF ILLINOIS.

INDEXING DEVICE FOR SLICING MACHINES.

Application filed June 5, 1922. Serial No. 566,067.

*To all whom it may concern:*

Be it known that I, PATRICK J. LUCEY, a citizen of the United States, and a resident of the city of Chicago, county of Cook, and State of Illinois, have invented certain new and useful Improvements in Indexing Devices for Slicing Machines, of which the following is a specification.

My invention relates to new and useful improvements in indexing devices for slicing machines.

With the indexing devices now in use it requires a careful and tedious manipulation, and it is therefore almost impossible, to change the index properly while the machine is slicing. It is my main object to provide indexing means for regulating the feed mechanism (in order to cut slices of the desired thickness), instantaneously and positively, by the mere pressure of a finger, and during the slicing operation.

Another object is to provide an indexing device comprising a plurality of indexing keys either one of which may be operated to actuate the adjusting bar, independently of the other keys.

These and other objects and advantages will become apparent from the following description taken in connection with the drawing, in which, Fig. 1. is a plan view of a slicing machine with my indexing device applied thereto.

In the drawings I have shown my invention embodied in various form, and adapted to suit various types of feed mechanisms.

In Figs. 1 to 5 inclusive, I have shown my invention mounted on the base 21 of a well known type of slicing machine, which is provided with the usual rotary knife 22, reciprocating table 23, feed plate 24, and feed screw 25 for moving said feed plate over the table, said feed screw being mounted in brackets 26 and 27 attached to the table and being arranged to actuate the feed nut 28 pivotally mounted on the bracket 29 on the feed plate. In this form of machine the feed screw is actuated by its attached pawl wheel 30 which is intermittently moved by a pawl 31 and its attached pawl lever 32, which is also pivoted on the feed screw 25, a suitable spring 33 holding the pawl in engagement with the pawl wheel and the spring 34 holding the lever in its retracted position.

The form of my invention illustrated in Figs. 1 to 5 inclusive comprises a housing 35 provided with a bracket 36 for mounting my indexing device upon a base 21 of a slicing machine with the use of suitable fastening members. This housing is provided with a pair of sleeves 37 and 38 in which the indexing member or adjusting bar 39 is slidably mounted, a spring pressed friction shoe 40 with an adjustable retaining cap 41 being mounted in said sleeve 37 to hold bar 39 normally against undesired slidable movement. The bar 39 is provided with teeth 42 which are engaged by a pinion 43 fastened on a stub shaft 44 rotatably mounted in said housing 35, a gear 45 being fastened on said shaft 44, beside pinion 43, and engaging the teeth of a rack bar 46 slidably mounted in a vertical channel member 47 supported in housing 35. The upper end of said rack bar is provided with a top or head plate 48 fitting in an opening in the top wall of said housing, and a spring 49 seated between said head plate 48 and said channel 47 normally retains said plate in said opening. The detachable bottom 35' is provided on said housing for convenience of assembling the parts therein. The casing 50 is fastened over the top of said housing and a plurality of indexing keys 51, 51', 52, 52', 53, 53' 54, 54', 55, 55', 56, 56', 57, 57' are slidably mounted in the upper wall of said casing and are provided with suitable heads, and with suitable springs between said heads and said upper wall of the casing for normally retaining said indexing keys in released position. The plate 58 is slidably mounted in said casing 50, over the head plate 48 and the top opening in the housing, said plate being provided with openings for the passage of the beveled hook portions 61, 61', 62, 62', 63, 63', 64, 64', 65, 65', 66, 66', 67, and 67', on said keys 51, 51', 52, 52', 53, 53', 54, 54', 55, 55', 56, 56', 57, and 57', respectively, to permit each of said keys to depress said head plate 48 in proportion to the length of its respective hook portions, which portions vary in length, preferably being shortest on the key at one end of the casing and longest on the key at the other end, each of said hook portions being shaped to catch beneath a slidable plate 58 and lock or retain said key and rack bar in depressed position whenever sufficiently actuated. A lever 68 extends upward from plate 58 and passes through the opening in the top of said casing 50, said lever providing means for moving said plate for the purpose of releasing the particular hook of the key which was locked beneath said plate, a spring 69 being provided to normally retain said lever and plate in locking position. The keys extend at varying length above said casing 50, in accordance with the length of their hook portions, and their operative effect on the plate 48.

In using my indexing device the usual index bar and actuating means thereof are removed from the machine and my indexing device is attached to the machine in place of said customary index mechanism. Since the machines differ in construction I adapt my index mechanisms to the various types of slicing machines, and I therefore show several modified forms of index devices in this application.

In operating the above described form of indexing device, shown in Figs. 1 to 5, it is merely necessary to depress the particular key by the slight pressure of one finger to move and retain the index bar 39 in the desired position, the key with the smallest hook 61 being actuated for the thinnest slice, and the key with the largest hook 67' being actuated for the thickest slice. Upon depressing the particular key its hook engages beneath plate 58 moved by the pressure of spring 69, and locks itself in position, until another key is depressed which moves said plate 58 depressing said spring and releasing the preceding key, thus only one key can act at a time, or said plate may be moved to release the key by moving lever 68 toward the near end of the casing. Upon depressing any one of the keys as stated above, said key depresses the head plate 48 and its attached rack bar 46 which rotates gears 45 and 43 and through gear 43 moves the index bar 39 to its desired position, in order to actuate the feed mechanism to cut slices of the particular thickness desired. The comparative size of the gears 45 and 43 will be arranged, either equal in size or varying, either one of which may be larger than the other, to properly accommodate the particular pitch of the worm and construction of the feed mechanism of the particular slicing machine.

Figure 1:
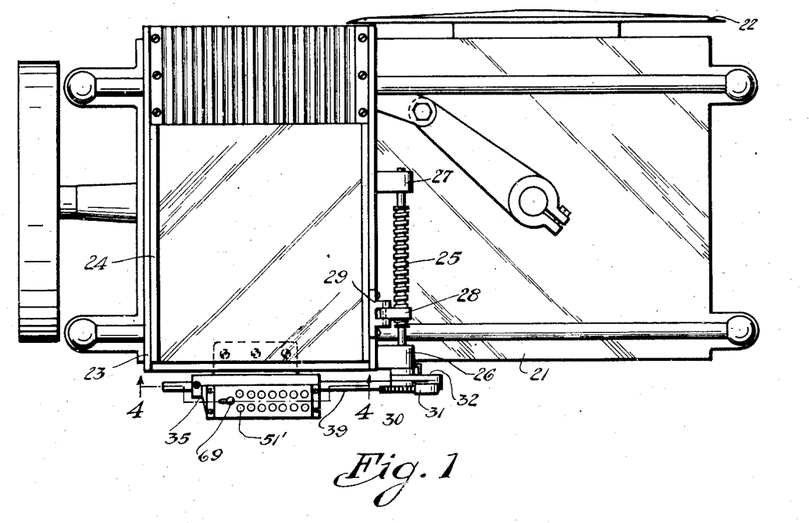
Figure 2:
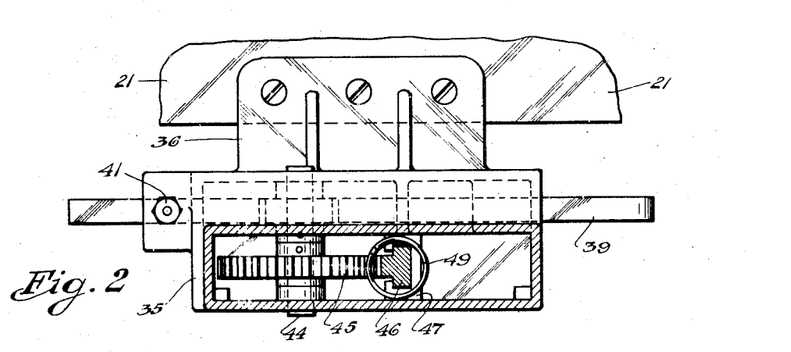
Fig. 2 is a detailed, horizontal sectional view taken on line 2—2 of Fig. 4.
Figure 3:
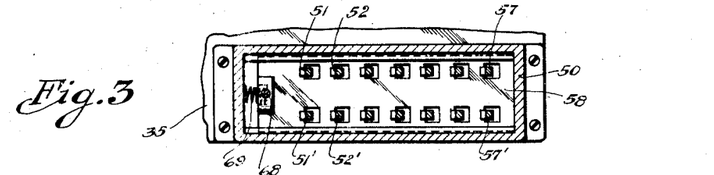
Fig. 3 is a detail horizontal sectional view on line 3—3 of Fig. 4.
Figure 4:
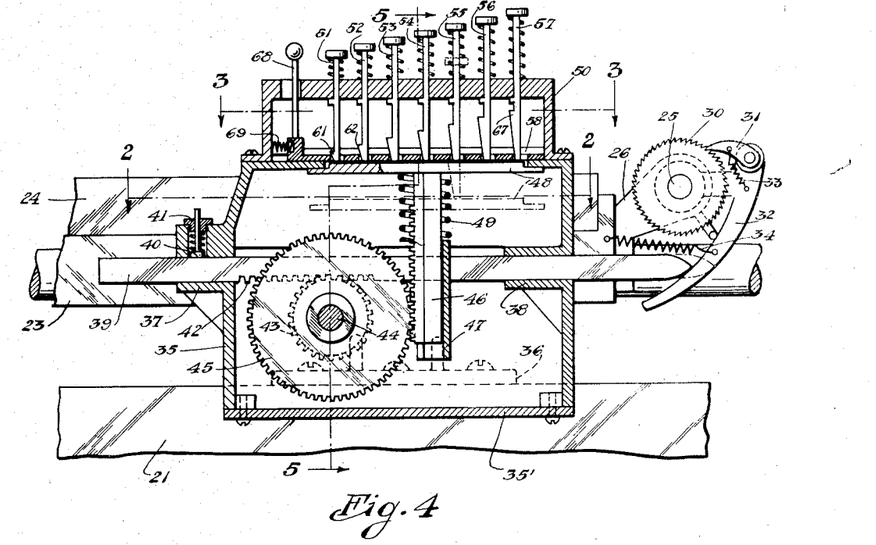
Fig. 4 is a vertical sectional view on line 4—4 of Fig. 1.
Figure 5:
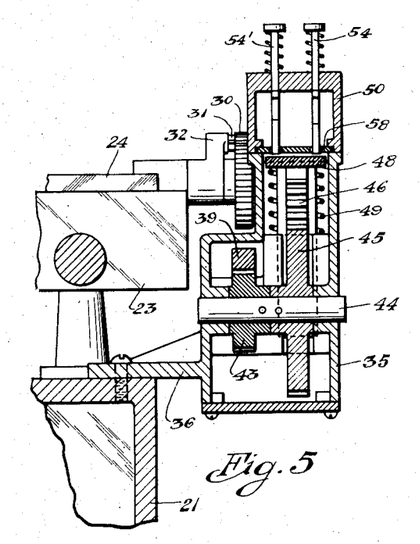
Fig. 5 is a vertical sectional view on line 5—5 of Fig. 4.
Figure 6:
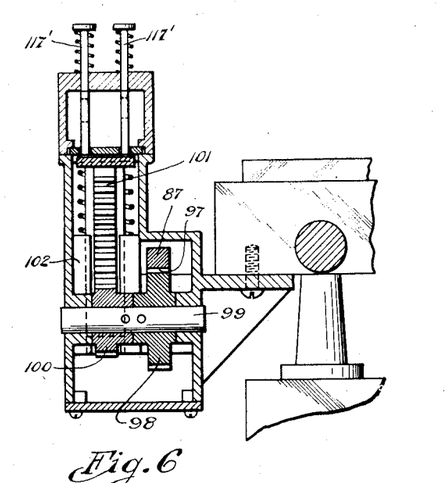
Fig. 6 is a vertical cross sectional view on line 6—6 of Fig. 7, of a modified form of index.
Figure 7:
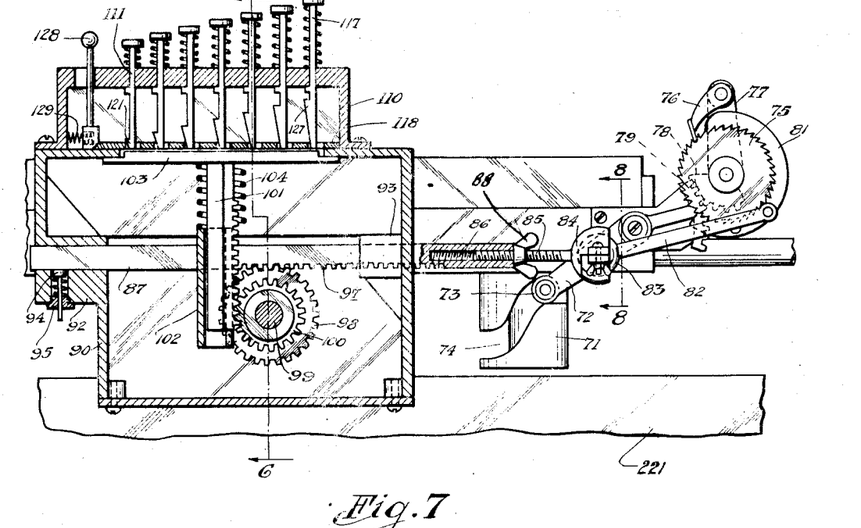
Fig. 7 is a longitudinal vertical sectional view of said modified form.
Figures 8, 9:
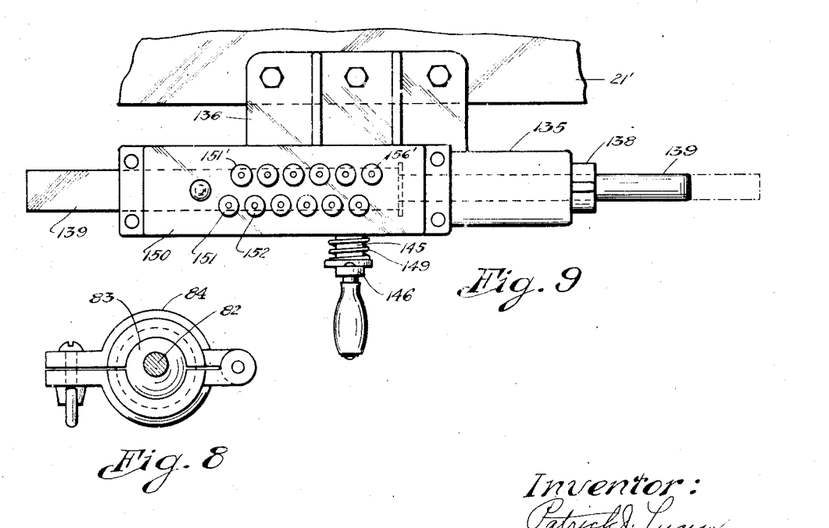
Fig. 8 is a sectional detail view taken on line 8—8 of Fig. 7.
Fig. 9 is a plan view of another modified form.
Figure 10:
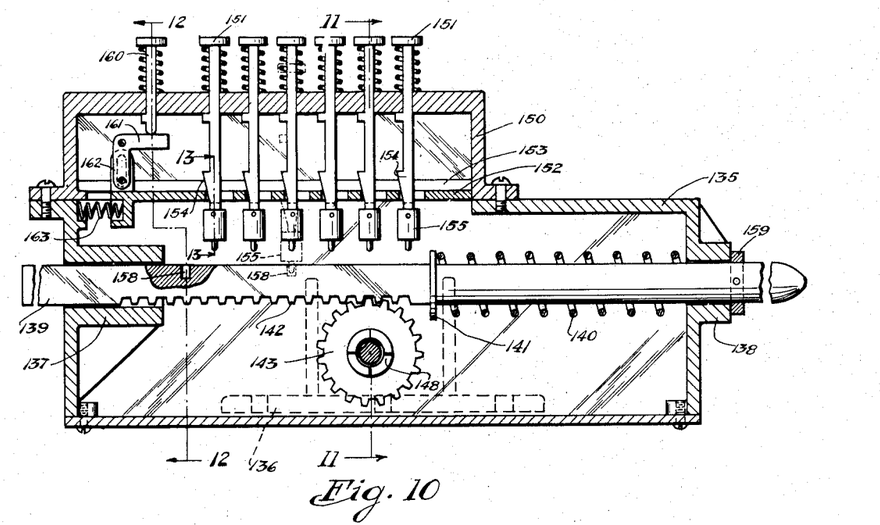
Fig. 10 is a vertical sectional view of said modified form taken on line 10—10 of Fig. 11.
Figures 11, 13:
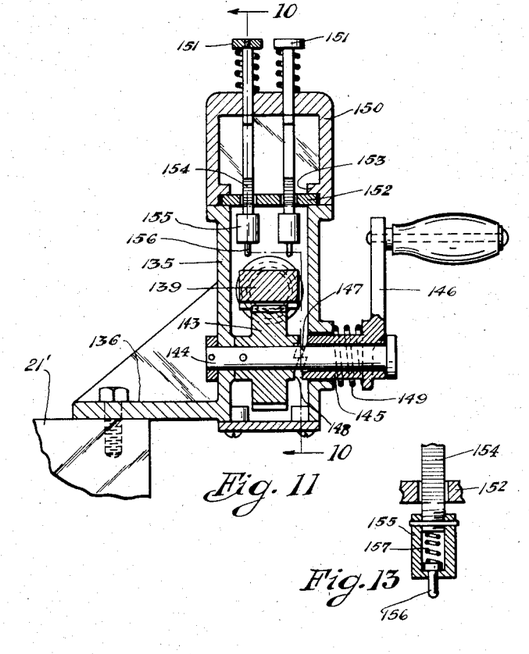
Fig. 11 is a vertical cross sectional view on line 11—11 of Fig. 10.
Fig. 13 is an enlarged sectional view on line 13—13 of Fig. 10, showing the index pin used in this form of my device.
Figure 12:
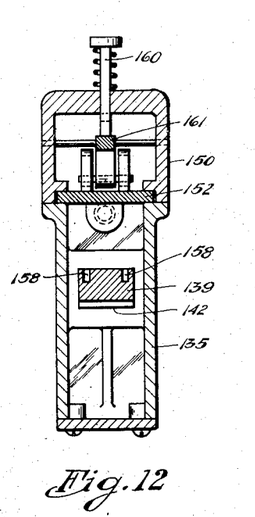
Fig. 12 is a vertical cross sectional view on line 12—12 of Fig. 10.
Figure 14:
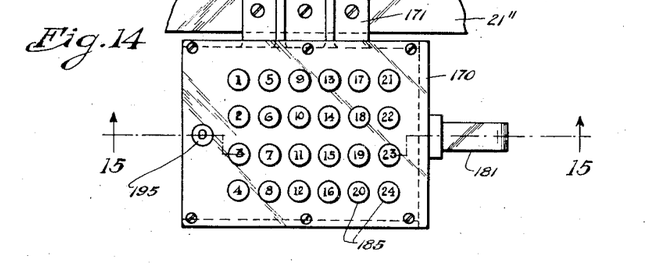
Fig. 14 is a plan view of a still further modified form of indexing device.
Figure 15:
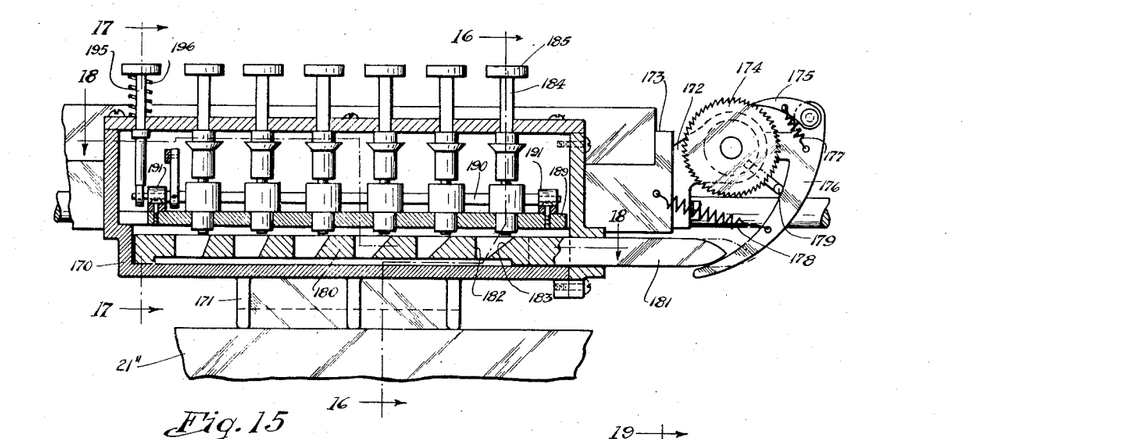
Fig. 15 is a longitudinal vertical sectional view on line 15—15 of Fig. 14.
Figure 16:
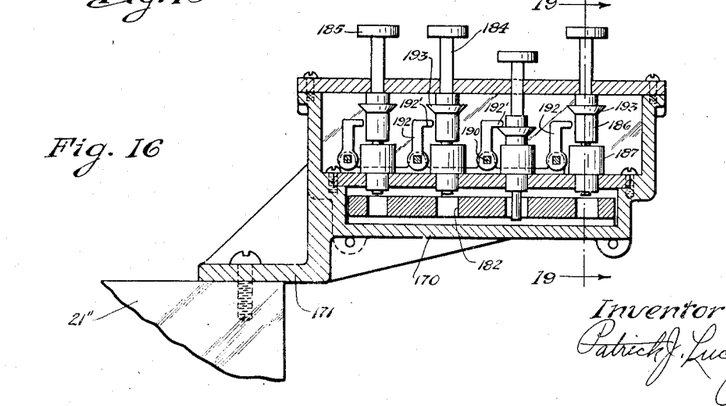
Fig. 16 is a vertical cross sectional view on line 16—16 of Fig. 15.
Figure 17:
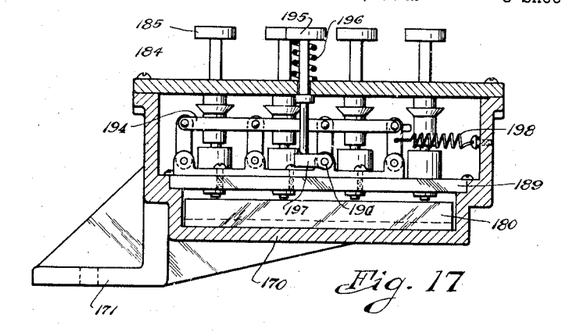
Fig. 17 is a vertical cross sectional view on line 17—17 of Fig. 15.
Figure 18:
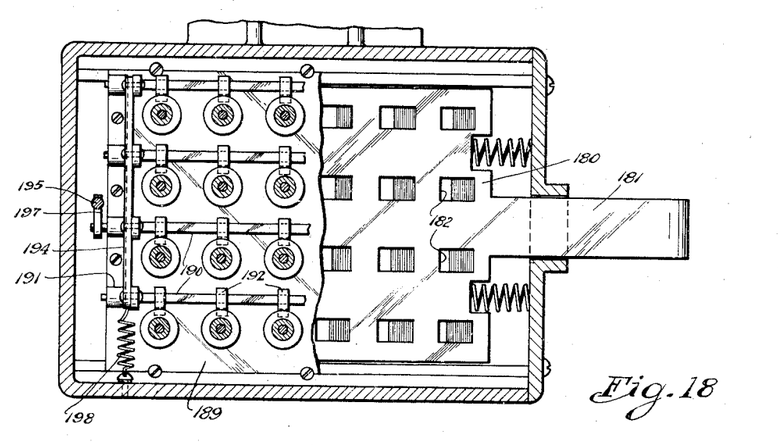
Fig. 18 is a horizontal sectional view on line 18—18 of Fig. 15.
Figure 19:
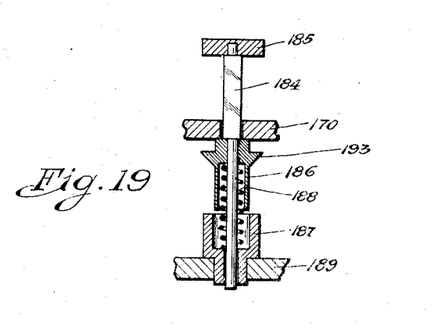
Fig. 19 is an enlarged detail sectional view of the index key used in this form of my invention.

In Figs. 6 to 8 inclusive I have illustrated a slightly modified form arranged to fit a slightly different type of feed mechanism, which mechanism is provided with a rotary cam 71 which rotates a constant and equal distance with each reciprocation of the feed table, and actuates the feed lever 72 actuating the pawl wheel 75 through the pawl 76 with its pawl lever 77, and segmental gears 78 and 79.

The feed screw cam 81, which is adjusted and set to engage beneath and release the pawl 76 and control or determine the particular thickness of the slice, is actuated by the link 82 provided with a ball head 83 forming a universal joint with the openable socket 84 retained clamped on said ball head by means of a suitable bolt or the like. One portion of said socket is rigidly attached to the indexing member or adjusting bar of my indexing device, which bar is in this form constructed in two parts to provide adjustment in its length, the part 85 connected to said socket being threaded to engage detachably in the sleeve 86 in the main portion 87 of said bar, and the lock nut 88 being provided to hold the threaded parts of the bar in adjusted position.

My indexing device in this form is very similar to that in the preceding form, being provided with a housing 90 having a bracket 91 to fasten the device on the base 221 of the machine by the use of suitable screws or similar fastening means. The adjusting bar is slidably mounted in the sleeves 92 and 93 in the near and far part of the housing, and the spring pressed friction shoe 94 bears on said bar, its pressure being adjustable by the screw cap 95. The bar 87 is provided with teeth 97 which are engaged by a pinion 98 fastened on the stub shaft 99 rotatably mounted in said housing, a gear 100 being fastened on said shaft 99 beside pinion 98 and engaging the teeth of a rack bar 101 slidably mounted in a vertical channel member 102 which is supported in said housing. The upper end of said rack bar is provided with a top plate 103 fitting in an opening in the top wall of said housing, and a spring 104 normally retains said plate in said opening. A casing 110 is fastened over the opening at the top of the housing, as in the preceding form, and a plurality of indexing keys 111, 111', to 117, and 117', are slidably mounted in the upper wall of said casing and are provided with suitable bearing heads or buttons and springs for retaining the keys released. A suitable plate 118 is slidably mounted in said casing 110, over said plate 103, said plate 118 being provided with openings for the passage of the hook portions 121, 121', to 127, and 127', on keys 111, 111', to 117, and 117', for depressing said head plate 103 and for the hook portions to engage beneath said plate 118 and retain the plate 103 and the rack bar 101 depressed. The plate 118 is provided with a lever 128 extending through the casing, while a spring 129 presses said lever and plate into locking position. The operation of the keys and the gear mechanism is like that in the preceding form, but since the end 85 of the index bar 87 is fastened to the universal joint it moves the feed screw cam 81 along with it when the bar is moved either forward through depression of one of the keys or backward through the reaction of the spring 104.

In Figs. 9 to 13 I have shown another modified form of indexing device adapted to suit a machine having a feed mechanism of the type shown in Figs. 1 to 5. This form, similar to the preceding form, comprises a housing 135 having a bracket 136 for fastening said housing on the base 21' by the use of fastening bolts or other suitable means. Said housing is provided with sleeves 137 and 138 in which the adjusting bar 139 has sliding movement, a coil spring 140 bearing between sleeve 138 and a collar 141 on said bar to retain said bar retracted. The bar 139 is provided with teeth 142 which are engaged by a pinion 143 fastened on a shaft 144 mounted with one end in one wall of said housing and at the other end in a bushing 145 of a handle 146, which bushing is rotatably mounted in the other wall of said housing, clutch teeth 147 being also provided on said bushing to engage similar teeth 148 on the side of pinion 143, and a spring 149 is placed between the handle and housing to normally retain the clutch in release position. Said lever provides manual means for moving the index bar 139 through said clutch and pinion. A casing 150 is suitably fastened over the top of said housing 135, and a plurality of alike indexing keys 151 are slidably mounted in the upper wall of said casing and are arranged certain distances apart in the direction of the adjusting bar, and are provided with suitable heads and release springs, as in the preceding forms. The plate 152 is slidably mounted on top of said housing and under flanges 153 in said casing, said plate having openings for the passage of beveled hook portions 154 on said keys 151, said hook portions passing through said openings and locking beneath the same. Fastened to the bottom of each of said hook portions 154 is an inverted shell 155 having a locking plunger 156, normally pressed outward from its lower end by a spring 157 in said shell. Each of said plungers is adapted to engage in one of the openings 158 provided on the upper part of the adjusting bar 139 to retain the bar in its adjusted position. A lug 159 is provided on said bar to prevent the spring 140 from forcing said bar out of position in the housing. A release key 160, provided with a suitable head and release spring, engages a lever 161 fulcrumed in the casing 150 and pivoted to a lug 162 on the plate 152, and a spring 163 operates between the housing wall and a pocket on the plate 152, to normally press said plate against the hook portions.

In operating this form of indexing device the proper key is depressed, the one nearest the release key for the thinnest slice, and the one farthest away from the release key for the thickest slice, whereby, the particular hook 154 engages beneath the plate 152, locking that key in depressed position, while its plunger 156 engages the top of bar 139 and is pressed upward into its shell 155 against its spring 157, whereupon the handle 146 with its sleeve 145 is pushed inward engaging clutch teeth 147 and 148, and the handle is rotated, moving pinion 143 and thereby sliding the adjusting bar 139 into the desired position, bringing the respective opening 158 beneath the depressed key and cap, and permitting the respective plunger 156 to be pressed into said opening through action of its spring 157, thus locking said indexing bar in said adjusted position, from which it is released by depressing either one of the remaining keys 151 or the release key 160. These keys, as well as those in the preceding forms, will be properly numbered to best suit each particular occasion.

In Figs. 14 to 19 inclusive I have illustrated still another modified form of indexing device. In this form the indexing member is engaged directly by the various indexing keys, each key moving the member a different distance. This form comprises a housing 170 provided with a bracket 171 for mounting said device on base 21″ of a slicing machine, which machine may be of the type illustrated in Figs. 1 to 5, provided with a bracket 172 extending from a reciprocating table 173 and carrying a pawl wheel 174 which is intermittently moved by a pawl 175 and its attached pawl lever 176 which is swingable on the axis of the pawl wheel 174. A spring 177 holds the pawl on the pawl wheel, and a spring 178 holds lever 176 in its retracted position against the stop arm 179 extending from the bracket 172.

The adjusting member in this form of indexing device is in the shape of a rectangular plate 180 slidably mounted on the bottom of the housing, and having an extension 181 in the form of a bar for engaging and actuating the pawl lever 176. Said plate is provided with a plurality of sets or rows of cam elements, which in the present form are shown in the shape of openings 182, each of which openings has a beveled side wall or side portion 183, in the direction of the feed mechanism, the degree of slant and therefore the length of the bevel of said side portions gradually varying from one end of the plate to the other, and from one side of the plate to the other. A plurality of similarly constructed keys comprising stems 184, are similarly mounted through openings in the top of said housing, and are provided with suitable marked or numbered heads 185 above said housing. Sleeves 186 are fastened to said stems inside of said housing, and cups 187 are slidably mounted in the lower end of said stems in position to receive said sleeves therein, the spring 188 normally preventing said sleeves and cups from telescoping. The cups are seated in a plate 189 mounted in the housing, above the adjusting member 180. The keys are arranged in rows, and directly above and in position to engage the cam elements or beveled side portions 183 of the openings 182, and alongside each row of keys a rod 190 is mounted in brackets 191 fastened on plate 189, each rod being provided with arms 192 having fingers 192′ for engaging beveled cam flanges 193 on the sleeves 186. The cross rod 194 operatively connects said rods 190, and a release key 195, which is normally retained in released position by a spring 196, engages an arm 197 fastened on one of said longitudinal rods 190 to actuate the cross rod 194 and with it all of the rods 190 and their arms 192 and fingers 192′, thereby moving said fingers away from above the flanges 193 in order to release any key that may have been depressed.

In operation, when any of the keys 184 is depressed the beveled flange 193 moves the finger 192′ of arm 192 outward, whereupon spring 198, attached to the cross rod 194 and the housing, moves said cross rod 194, the longitudinal rods 190, and thereby the respective arm 192 and its finger 192′ over said flange 193 to lock said key in depressed position. The depression of said key moves its lower end over the corresponding bevel portion 183 and moves the adjusting member horizontally in accordance with the horizontal distance of said bevel portion, in the direction of the feed mechanism and into its adjusted position. And by means of the beveled flanges on the keys and fingers on the rods, as above described, the depression of either key will release any other key that may be set, thus providing an adjusting device or indexing device in which only one key will be operated at a time.

It is apparent from the above disclosure that with the use of my indexing device the feed mechanism is properly operable while the machine is slicing, and immediately and positively by actuating either one of a number of index keys, by merely depressing such key, without affecting any of the other keys, and also that the indexing device will be modified to fit the various forms of slicing machines; whereas in indexing devices now on the market the index actuating mechanism cannot be operated properly while the machine is slicing because the change of the indexing device requires a gradual turn or gradual movement of the indexing mechanism, from one indexing number or position over the adjacent numbers or positions to arrive at the desired indexing position, that is, the indexing mechanism must move over intermediate positions to arrive at the position desired, and therefore the machine will be cutting slices of varying thickness during the change of the indexing mechanism; whereas with my indexing device the change is effected substantially instantaneously and only while the table is moving in released position, that is, while the machine is not slicing.

What I claim as new and desire to secure by Letters Patent is:

1. An indexing device for a slicing machine, comprising means for connecting said device with said machine, indexing means for actuating a feed mechanism of said machine, and means for adjusting said indexing means by a mere pressure of a finger in a right-line direction.

2. An indexing device for a slicing machine, comprising supporting means for attaching said device to said machine, indexing means for actuating the feed mechanism of said machine and means movable in a straight line for setting said indexing means.

3. An indexing device for a slicing machine, comprising supporting means for attaching said device to said machine, indexing means for actuating the feed mechanism of said machine, and means including a plurality of members, each individually capable of actuating said indexing means independently of the other.

4. An indexing device for a slicing machine, comprising supporting means for attaching said device to said machine, indexing means for actuating the feed mechanism of said machine, and a plurality of vertically movable members, each capable of moving said indexing means a different distance.

5. An indexing device for a slicing machine, comprising a housing provided with means for attaching the device on the machine, means movably mounted on said housing for engaging and actuating the feed mechanism, and means including a plurality of elements operable by a slight right-line pressure for adjusting said feed mechanism.

6. An indexing device for a slicing machine, comprising a housing, provided with means for mounting it on the machine, means slidably mounted in said housing for actuating the feed mechanism, and means including a plurality of readily depressible members for moving said indexing member in the desired position with respect to the feed mechanism.

7. An indexing device for a slicing machine, comprising a housing provided with means for mounting it on a slicing machine, means slidably mounted in said housing for intermittently engaging and actuating the feed mechanism, and means visible and operable from above by the pressure of one finger for adjusting said slidable means with respect to the feed mechanism.

8. An indexing device for a slicing machine, comprising a housing provided with means for attaching said device to said machine, means slidably mounted in said housing for actuating the feed mechanism, and means including a plurality of independently movable members operable from above for actuating said slidable elements different distances.

9. An indexing device for a slicing machine, comprising mounting means, an indexing bar slidably mounted in said housing, and a plurality of indexing members for actuating said bar, each of said members being arranged to release any of the other members which may be in operated position.

10. An indexing device for a slicing machine, comprising a housing, means for mounting said housing on the machine, indexing means slidably mounted on said housing for moving the feed mechanism of said machine, means including a rack bar for actuating said indexing means, and separate elements for individually actuating said rack bar.

11. An indexing device for a slicing machine, comprising a housing and means for mounting it on the machine, indexing means slidably mounted in said housing for actuating the feed mechanism of said machine, rotatable means for actuating said indexing means, a vertically movable member for actuating said rotating means, and separate vertically movable elements for individually actuating said member and thereby said rack bar.

12. An indexing device for a slicing machine, comprising a housing and means for mounting said housing on the machine, an indexing bar slidably mounted in said housing arranged to move the feed mechanism of said machine, gear means for actuating said indexing bar, a bar provided with a head plate for actuating said gear means, and a plurality of means for individually actuating said head plate.

13. An indexing device for a slicing machine, comprising a housing and means for mounting said housing on the machine, an indexing bar slidably mounted in said housing arranged to move the feed mechanism of said machine, gear means for actuating said indexing bar, a bar provided with a head plate for actuating said gear means, a plurality of means for individually actuating said head plate, and means including hooks on said keys and a sliding plate in said housing for locking said keys in depressed position.

14. An indexing device for a slicing machine, comprising a housing and means for mounting said housing on the machine, an indexing bar slidably mounted in said housing arranged to move the feed mechanism of said machine, gear means for actuating said indexing bar, a bar provided with a head plate for actuating said gear means, a plurality of means for indvidually actuating said head plate, means including hooks on said keys, a sliding plate in said housing for locking said keys in depressed position, and means for releasing any or all of said keys simultaneously.

15. An indexing device for a slicing machine, comprising supporting means with means thereon for mounting the device on the machine, an adjusting member slidably mounted on said supporting means in position to actuate the feed mechanism, and means including a plurality of independently movable members for retaining said adjusting member at different positions of adjustment.

16. An indexing device for a slicing machine, comprising supporting means with means thereon for mounting the device on the machine, an adjusting member movably mounted on said supporting means in position to actuate the feed mechanism, means including a plurality of keys each arranged for moving said adjusting member a different distance, and means for retaining any actuated key in its set position.

17. An indexing device for a slicing machine, comprising supporting means with means thereon for mounting the device on the machine, an adjusting member slidably mounted on said supporting means in position to actuate the feed mechanism, and a plurality of keys movably mounted in said supporting means for variously setting said adjusting member, said keys varying in height above said supporting member in accordance with the distance which they move said adjusting member.

18. An indexing device for a slicing machine, comprising supporting means with means thereon for mounting the device on the machine, an adjusting member slidably mounted on said supporting means in position to actuate the feed mechanism, and a plurality of depressible keys mounted in said supporting means for variously setting said adjusting member, said keys varying in length for moving said adjusting member various distances, and means for locking said keys in adjusted position.

19. An indexing device for a slicing machine, comprising supporting means with means thereon for mounting the device on the machine, an adjusting member slidably mounted on said supporting means in position to actuate the feed mechanism, and a plurality of depressible keys mounted in said supporting means for variously setting said adjusting member, said keys varying in length for moving said adjusting member various distances, means for locking said keys in adjusted position, and means for releasing all of said keys from said locked position.

20. An indexing device for a slicing machine having a feed lever, said device comprising supporting means, means thereon for mounting the device on the machine, an adjusting member slidably mounted in said supporting means for intermittently engaging and actuating said feed lever and keys on said supporting means for moving said adjusting member different distances for engagement with said feed lever.

21. An indexing device for a slicing machine having a feed mechanism, said device comprising supporting means and a bracket for mounting it on the machine, an indexing bar slidably mounted in said supporting means, said bar being adjustable for length and provided with a universal joint for attaching it to the feed mechanism, and a plurality of means for individually setting said indexing bar.

22. An indexing device for a slicing machine having a feed mechanism, said device comprising supporting means and a bracket for mounting it on the machine, an indexing bar slidably mounted in said supporting means, said bar being provided in two parts adjustably connected, one of which parts is attached to the feed mechanism, a plurality of keys for individually setting said indexing bar, and means for releasing said keys.

23. An indexing device for a slicing machine, comprising a housing and means on said housing for mounting it on the machine, an indexing bar slidably mounted in said housing and having notches, keys movably mounted in said housing and having yieldable means for engaging in said notches to hold the bar in position, and manual means for moving said bar until said yieldable means locks it in position.

24. An indexing device for a slicing machine, comprising a housing and means on said housing for mounting it on a machine, an indexing bar slidably mounted in said housing and having notches on its upper edge, members movably mounted in said housing and having plungers at their lower ends for engaging in said notches to retain the bar in position, and means including a hand crank and clutch pinion for moving said bar until the plunger descends into one of said notches.

25. An indexing device for a slicing machine, comprising indexing means for actuating the feed mechanism of said machine and means operable by a slight right-line pressure for setting said indexing means.

26. An indexing device for a slicing machine, comprising means for mounting said device on said machine, indexing means for actuating the feed mechanism of said machine, and means moveable in a straight line for setting said indexing means.

27. An indexing device for a slicing machine, comprising a housing provided with means for attaching the device on the machine, means moveably mounted on said housing for actuating the feed mechanism, and means operable by a slight right-line pressure for adjusting said feed mechanism.

28. An indexing device for a slicing machine, having a feed mechanism, said device comprising supporting means and means for mounting said device on the machine, indexing means for operating the feed mechanism, said indexing means being provided with a plurality of cam means and with a plurality of elements slideable in the upper part of said supporting means, each slideable element being arranged to operate one of said cam means and thereby move the indexing means independently of the other cam means and for a different distance.

In testimony whereof I have signed my name to this specification in the presence of two subscribing witnesses.

PATRICK J. LUCEY.

Witnesses:
J. DANIEL STUWE,
LORENZO P. GAYLORD.